United States Patent [19]

Schneider et al.

[11] 4,274,997
[45] Jun. 23, 1981

[54] HALOGENATED POLYMERS STABILIZED WITH TRIAZOLES

[75] Inventors: Charles A. Schneider, Villa Hills, Ky.; Thomas C. Rees, Park Forest South, Ill.

[73] Assignee: The Sherwin-Williams Company, Cleveland, Ohio

[21] Appl. No.: 964,851

[22] Filed: Nov. 29, 1978

[51] Int. Cl.³ .................... C08K 3/10; C08K 3/22; C08K 5/34
[52] U.S. Cl. .................. 260/45.75 W; 260/23 XA; 260/45.75 R; 260/45.8 NT
[58] Field of Search .............. 260/45.75 W, 45.8 NT

[56] References Cited

U.S. PATENT DOCUMENTS

| | | | |
|---|---|---|---|
| 2,985,619 | 5/1961 | Roos et al. | 260/45.8 NT |
| 3,367,907 | 2/1968 | Hansen | 260/45.8 NT |
| 3,390,111 | 6/1968 | Scullin et al. | 260/45.75 W |
| 3,413,227 | 11/1968 | Howard et al. | 260/45.8 NT |
| 3,429,732 | 2/1969 | Baitinger, Jr. | 260/45.8 NT |
| 3,454,514 | 7/1969 | Baum | 260/45.75 W |
| 3,463,756 | 8/1969 | Charnier et al. | 260/45.75 W |
| 3,509,092 | 4/1970 | DiGiaimo | 260/45.8 NT |
| 3,674,730 | 7/1972 | King | 260/45.75 W |
| 3,720,616 | 3/1973 | Randell et al. | 260/45.8 NT |
| 3,721,645 | 3/1973 | Zemlin | 260/45.8 NT |
| 3,957,723 | 5/1976 | Lawson et al. | 260/45.75 W |
| 4,087,399 | 5/1978 | Hamada et al. | 260/45.8 NT |
| 4,096,128 | 6/1978 | Frisch et al. | 260/45.8 NT |
| 4,169,112 | 9/1979 | Elmer et al. | 260/45.8 NT |

Primary Examiner—Hosea E. Taylor
Assistant Examiner—R. A. White
Attorney, Agent, or Firm—James V. Tura; Robert E. McDonald

[57] ABSTRACT

This invention is directed to a process for stabilizing halogenated polymers by the addition of effective amounts of at least one aromatic triazole. More particularly, the invention is directed to the addition of at least one aromatic triazole to halogenated polymers which contain zinc ions.

9 Claims, No Drawings

HALOGENATED POLYMERS STABILIZED WITH TRIAZOLES

This invention relates to novel compositions and the process for preparing stabilized halogenated polymers. Specifically, the invention relates to the addition to one or more aromatic triazoles to halogenated polymeric compositions particuarly polymeric compositions which contain zinc ions to stabilize the halogenated polymers against degradation at increased temperatures. It has been found that aromatic triazoles can be used to prevent degradation of halogenated polymers and more particularly triazoles are effective in stabilizing halogenated polymers in the presence of zinc ions, e.g. zinc oxide. The triazoles protect the halogenated polymers from their autocatalytic dihydrohalogenation due to the presence of small amounts of hydrogen chloride released from the polymers at increased temperatures. More specifically, the presence of hydrogen chloride and zinc ions have a serious degradation effect on halogenated polymers.

It is generally known that various polymeric compositions including homopolymers, copolymers, terpolymers and various physical mixtures of polymers containing halogen ions, at increased temperatures cause halogen, e.g. chlorine to be released forming HCL and leave an unsaturated linkage in the polymeric structure. This unsaturation is easily oxidized leading to degradation of the polymers. Generally, to avoid dehalogenation or decomposition of halogenated polymers it was found necessary to incorporate therein stabilizing amounts of various inorganic compounds and particularly compounds of zinc.

In effect, there is belief to be a double decomposition reaction where the halogen, e.g. chlorine evolved from the polymers react with the zinc to form the corresponding chloride. This functions as a Lewis acid which catalyzes degradation of the polymer. This was particularly noticed in processing various halogenation polymers in the presence of zinc compounds, e.g. vinyl chloride resins containing zinc salts at elevated temperatures whereupon the composition suddenly darkened or turned black after a processing period at higher temperatures. This is sometimes referred to as "catastropic" degradation.

In addition to zinc compounds, various other metallic compounds were used in conjunction with zinc including compounds such as barium, lead, calcium, cadmium and mixtures thereof. Thus, the tolerance of halogenated polymeric compositions for zinc or combinations of zinc with other metal inorganic is unpredictable and even from batch to batch during the processing stages the compositions are sometimes classified as to their tolerance with respect to zinc.

Accordingly, it has been found that various halogenated polymers such as polyvinyl chloride, etc. can be stabilizing against catalytic unsaturation during heat processing by eliminating the adverse activity of zinc, e.g. zinc salts or soaps by incorporating in the polymers effective amounts of aromatic triazoles. The triazoles are added in sufficient quantity to stabilize the polymers against degradation at temperatures in excess of about 180° C.

More specifically, it has been found that effective amounts e.g. 0.05 to 10% by weight of the polymers, of at least one aromatic triazole including, for example, benzotriazole, tolyltriazole and various mixtures thereof are effective stabilizers. The triazoles function as a stabilizer against dehydrohalogenation particularly in polymers which contain zinc oxide. This is evidenced by controlling the viscosity as measured by the increase of viscosity of the polymer as measured by DeCoste, see the torque rheometer of J. B. DeCoste (SPE Journal pp. 764-773, August, 1965). Similar instruments are commercially available. In this particular process, 2-fluted blades rotate interiorly in opposite directions at a 3 to 2 speed ratio. A sample of the polymer is subjected to sheer forces. The torque is measured in grams-meters by a dynamometer and the torque is a function of sheer rate and temperatures. The temperature is measured by a thermocouple in the interior of the chamber. Stability time is measured from a plotted torque-time curve and is a measure of time from torque breakdown to flexing torque. These two points are determined at the point of tangency of an angle of 30° C. to the time X'-X axis to the point on the plotted curve where the rate of change are at a maximum.

It has been found that various halogenated polymers such as polyvinyl chloride and vinylidene chloride can be stabilized against catalytic degradation not only by eliminating the zinc compounds but also by incorporating in the halogenation polymers containing zinc ions effective amounts of at least one aromatic triazole. This is evidenced by control of the viscosity as measured by viscosity increases of the polymer under controlled testing procedures.

The following examples illustrate the advantages in using at least one aromatic triazole as a stabilizer for halogenated polymers.

EXAMPLE I

A polyvinyl chloride resin was compounded on a two-roll laboratory mill.

Initially to 100 grams of the resin were incorporated a mixture of 1.6 parts tolyltriazole per hundred (phr) parts of resin in 17 parts of diisodecyl phthalate. 33 phr of dioctylphthalate and 1 part of stearic acid were milled into the compounded material with 7.5 parts of epoxidized soya bean oil.

Total time for mixing was six minutes at 370° F. The compounded plastic was sheeted off, cooled, granulated and tested for stability.

EXAMPLE II

Comparable, in detail, with Example 1, except with the further addition of 0.8 phr of barium, cadmium and zinc soap stabilizers (Blanchford BC 500-England) to the resin.

EXAMPLE III

Comparable, in detail, with Example II, except that 1.6 parts of the tolyltriazole per hundred parts resin (phr) was eliminated from the master batch as a control test:

TABLE I

|  | Metal phr-Stabilizer Soaps | Triazole phr | Rheometer Time 200° C. |
|---|---|---|---|
| Example I | 0 | 1.6 | 28 |
| Example II | 0.8 | 1.6 | 27 |
| Example III | 0.8 | 0 | 20 |

Other aromatic triazoles effective in addition to benzotriazole and tolyltriazole are the analogues and homologues thereof, e.g. 4-phenyl-1, 2,3triazole; 1,2-naphtho triazole; 4-nitrobenzotriazole, etc.

The above were tested by exposing the compounded resin to temperatures of 200° C. while operating the shear of the testing unit at a standard rotation of 100 r.p.m. One, then, measures the time to the first change in the viscosity of the mix under test in the rheometer.

It will be observed from the foregoing examples that the triazoles are about 40% more effective in stabilizing the halogenated resins, in the rheometer test, than the metal soaps alone. Thus, while it has been noted that zinc soaps alone are not totally effective to improve the stability of halogenated polymers, it has been discovered that if the zinc is present as an inorganic compound, e.g. zinc oxide for the suppression of smoke and flame (See U.S. Ser. No. 886,463, filed Mar. 14, 1978, now abandoned) an entirely different relationship appears to exist. In this latter instance, it appears that addition of the triazoles has a stabilizing effect upon the zinc in the form of ZnO. Zinc oxide is especially known to be detrimental to the heat stability of halogenated polymers such as polyvinyl chloride and polyvinylidene chloride. The reaction of zinc oxide or other basic zinc salts (in the presence of traces of HCl) forms zinc chloride. There is evidence that zinc chloride catalyzes dehydrohalogenation of the polymer. Thus, zinc chloride not only shortens the stability period, but decomposition once started becomes so rapid in hydrogen chloride evolution, that in a confined volume with heat processing above about 180° C. (as in an injection molding machine) explosions are possible and have been noted in the prior art.

It has been found that addition of aromatic triazoles to halogen polymers containing zinc oxide or an inorganic salt of zinc appears to provide greater stability than has been obtained in the absence of both zinc and aromatic triazole. The combined inhibition of the triazole on the dehydrogenation catalytic activity of the zinc is of particular interest. Measurement of Oxygen Index is also a reflection of flame retardance as well as general formulation stability.

The Oxygen Index method provides a rapid reproducible determination providing a key to the behavior of the substance tested in an uncontrolled fire situation. It is identified as ASTM D-2863 test method.

ASTM D-2863 provides for a flow of a mixture of nitrogen and oxygen at a total flow rate of 18 liters/minute through a cylindrical glass column of 78.1 cu$^2$/cross-section. The flow rate of the individual gases at 25#/sq. in (psi) is measured and adjusted by flowmeters. The column is purged for 30 seconds. The sample which is 6"×¼"×⅛" (150×6×3 min.) is mounted vertically in the center of the glass column and ignited. The Oxygen Index, sometimes called the LOI or Limited Oxygen Index is that concentration of oxygen in the gas stream, in percentage, which will just support combustion for a minimum of 3 minutes or for a length of at least 50 minutes. Thus, the higher the percentage of oxygen essential, the more fire retardant is the sample tested.

EXAMPLE IV

A flexible polyvinyl chloride (100 parts by weight) resin was malaxated to produce a base with 33 parts dioctylphthalate, 17 parts diisodecylphthalate, 1 part stearic acid, 7.5 parts epoxidized soya bean oil and 0.8 parts of a Ba/Cd zinc stabilizer (1) additive as in Example II. The aliquot portions of the foregoing mixture were incorporated a series of varying inorganic flame retardants and an aromatic (tolyl) triazole. The specific information and the test data obtained are set out in Table II.

TABLE II

| Run No. | phr Flame Retardant | phr Tolyltriazole | Rheometer 200° C. | Oxygen Index |
|---|---|---|---|---|
| 1 | None Present | 0 | 20.0 | 22.0 |
| 85 | 4 A + C | 0 | 7.8 | 26.5 |
| 86 | 4 A + C | 0.8 | 24.7 | 26.0 |
| 87 | 4 A + C | 1.6 | 34.8 | 26.5 |
| 108 | 4 B + C | 0 | 6.6 | |
| 109 | 4 B + C | 0.8 | 8.9 | |
| 110 | 4 B + C | 1.6 | 15.7 | |
| 111 | 4 B + C | 0.3* | 9.5 | |

A = calcium molybdate as 9.4% MoO$_3$
　　　　　　　　　　　　　11.0% ZnO
　　　　　　　　　　　　　79.0% calcium carbonate
B = Zinc molybdate as 15% MoO$_3$
　　　　　　　　　　　85% ZnO
C = Sb$_2$O$_3$ at 2 phr.

*Tolyltriazole was first coated on the surface of B.

The tabulated data establishes that with no additives a data base for comparisons with the usual halogenated polymer of the prior art containing Sb$_2$O$_3$ as a standard stabilizing material is established.

It is observed in the presence of ZnO in a calcium molybdate composition but without the aromatic triazole the metallic form of zinc (ZnO) while increasing the Oxygen Index favorably, has an extremely adverse effect upon the rheometer data, indicating the catalytic dehydrohalogenation of the halogenated polymer by action of the inorganic zinc present in additive A.

However, in the presence of 0.8 phr of the aromatic triazole there is about 300% improvement in stability. At 1.6 phr of triazole there is a further 42% increase in the stability test.

In the case of B additive, where the zinc is in an apparently more reactive form (Run 108) the aromatic triazole provides a 35% increase in the first increment (Run 109) and over a 78% addition increase at the second level (Run 110) of triazole addition. Run 111 is of interest in indicating that when the zinc molybdate (B) is pre-coated with triazole as low as 0.3 phr provides about 50% increase in stability time in the rheometer test.

The above testing was repeated using a rigid PVC resin.

EXAMPLE V 100 parts by weight of rigid PVC were malaxated with 1.5 parts acrylic processing aid, 1.2 parts petrolatum, 2 parts calcium stearate, 0.2 parts carbon black and 0.5 parts methyl tin stabilizers plus additives. Three aliquot samples were prepared from the above base. CD-1 contained no A composition, nor any aromatic tolyltriazole. CD-4 contained 4 phr of A composition and no aromatic triazole while CD-12 contained 1 phr of tolyltriazole. The data from these runs are set out in Table III.

TABLE III

| Run No. | phr (A) | phr Tolyltriazole | Rheometer 210° C. (Minutes) |
|---|---|---|---|
| CD-1 | 0 | — | 6.2 |
| CD-4 | 4 | — | 5.0 |
| CD-12 | 4 | 1 | 8.8 |

The above data demonstrates the catalytic dehydrohalogenation of the "A" composition containing ZnO and the inactivation thereof by the presence of the aromatic triazole.

EXAMPLE VI

A polymer containing a blend of polyvinylchloride and ABS (acrylonitrile-butadiene-styrene) polymer having 13.5% chlorine content in the alloy thereof was formulated in a commercial blend containing 2.5 phr of $Sb_2O_3$ as a flame retardant (except in one run URC 13 where none was present). In runs similar to those above, the following Table of data was prepared.

TABLE IV

| Run No. | phr "A" Composition Flame Retardant | phr Tolytriazole | Rheometer 193° C. | Oxygen Index |
|---|---|---|---|---|
| URC-13 | 0 | 0 | 13.0 | |
| URC-9 | 5.1 | 0 | 10.5 | 25.5 |
| URC-16 | 5.1 | 0.5 | 13.5 | 26.5 |
| URC-15 | 5.1 | 1.0 | 15.3 | 26.0 |

Run URC-9 demonstrates the dehydrohalogenation catalytic activity of the zinc oxide present in "A" composition. URC-16 and URC-15 show positive values over the standard containing no zinc oxide and no triazole in the inhibitory effect of the triazole. Examination of the right hand column in Table II and IV shows that tolyltriazole has little or no effect on flammability as measured by Oxygen Index.

While this invention has been described by a number of specific embodiments, it is obvious there are variations and modifications which can be made without departing from the spirit and scope of the invention as set forth in the appended claims.

The invention claimed is:

1. A halogenated polymeric composition containing a sufficient amount of an aromatic triazole to prevent degradation at temperatures exceeding 180° C. which comprises at least one polymer selected from the group consisting of polyvinyl chloride, polyvinylidene chloride and combinations thereof and a stabilizing amount of at least one aromatic triazole selected from the group consisting of benzotriazole, tolyltriazole and combinations thereof.

2. A halogenated polymeric composition containing a zinc compound and sufficient amounts of aromatic triazole to stabilize the polymers at temperatures exceeding 180° C. which comprises at least one polymer selected from the group consisting of polyvinyl chloride, polyvinylidene chloride and combinations thereof and at least one triazole selected from the group consisting of benzotriazole, tolyltriazole and combinations thereof.

3. A method of stabilizing halogenated polymeric compositions at temperatures exceeding 180° C. which comprises incorporating into the polymers a stabilizing amount of at least one aromatic triazole selected from the group consisting of benzotriazole, tolyltriazole and combinations thereof.

4. The method of claim 3 further characterized in that the halogenated polymers are selected from the group consisting of polyvinyl chloride, polyvinylidene chloride and combinations thereof.

5. A method of stabilizing halogenated polymeric compositions containing zinc compounds which comprises incorporating in the polymers stabilizing amounts of at least one aromatic triazole selected from the group consisting of benzotriazole, tolyltriazole and combinations thereof to stabilize the polymers at temperatures in excess of 180° C.

6. The method of claim 5 further characterized in that the zinc compound is zinc oxide.

7. The halogenated polymer of claim 1 further characterized in that at least one of the aromatic triazoles is present in an amount ranging from about 0.05 to 10% by weight of the polymer.

8. The polymer of claim 1 further characterized as containing a zinc compound.

9. The polymer of claim 8 further characterized in that the aromatic triazole and the zinc compound are present in the halogenated polymer at the ratios of 1.0 to 10 parts by weight of the triazole to 10 to 1 parts by weight of the zinc compound.

* * * * *